(12) United States Patent
Peters

(10) Patent No.: US 10,041,012 B2
(45) Date of Patent: Aug. 7, 2018

(54) STAGGERED FIRED HEATER MANIFOLDS

(71) Applicant: UOP LLC, Des Plaines, IL (US)

(72) Inventor: Kenneth D. Peters, Elmhurst, IL (US)

(73) Assignee: UOP LLC, Des Plaines, IL (US)

( * ) Notice: Subject to any disclaimer, the term of this patent is extended or adjusted under 35 U.S.C. 154(b) by 993 days.

(21) Appl. No.: 14/466,293

(22) Filed: Aug. 22, 2014

(65) Prior Publication Data

US 2016/0053186 A1 Feb. 25, 2016

(51) Int. Cl.
*C10G 59/02* (2006.01)
*B01J 8/04* (2006.01)
*B01J 19/24* (2006.01)
*C10G 35/04* (2006.01)
*B01J 8/08* (2006.01)
*B01J 8/12* (2006.01)
*B01J 8/00* (2006.01)

(52) U.S. Cl.
CPC ............. *C10G 59/02* (2013.01); *B01J 8/008* (2013.01); *B01J 8/0407* (2013.01); *B01J 8/0415* (2013.01); *B01J 8/0419* (2013.01); *B01J 8/0442* (2013.01); *B01J 8/0492* (2013.01); *B01J 8/0496* (2013.01); *B01J 8/087* (2013.01); *B01J 8/12* (2013.01); *B01J 19/245* (2013.01); *C10G 35/04* (2013.01); *B01J 8/0426* (2013.01); *B01J 2208/0053* (2013.01); *B01J 2208/00168* (2013.01); *B01J 2208/00176* (2013.01); *B01J 2208/00504* (2013.01)

(58) Field of Classification Search
CPC ........ C10G 35/04; C10G 59/02; C10G 65/04; C10G 65/10
See application file for complete search history.

(56) References Cited

U.S. PATENT DOCUMENTS

| | | | |
|---|---|---|---|
| 3,390,721 | A | 7/1968 | Noe |
| 3,706,536 | A | 12/1972 | Greenwood |
| 4,166,434 | A | 9/1979 | Jensen et al. |
| 5,865,986 | A | 2/1999 | Buchanan |
| 7,201,883 | B2 | 4/2007 | Bowe et al. |
| 7,740,751 | B2 | 6/2010 | Peters |
| 8,282,814 | B2 | 10/2012 | Peters |
| 8,512,426 | B2 | 8/2013 | Parameswar et al. |

OTHER PUBLICATIONS

PCT International Search Report and Written Opinion dated Dec. 17, 2015 for PCT/US2015/037889, Applicant file reference H0043825.

(Continued)

*Primary Examiner* — Renee E Robinson

(57) ABSTRACT

A hydrocarbon conversion process is described. The process includes passing a hydrocarbon stream through a plurality of reaction zones and a plurality of fired heaters, the effluent from a first reaction zone passing through one of the plurality of fired heaters before entering a second reaction zone. The plurality of fired heaters include a radiant section, an inlet manifold, an outlet manifold, at least one heater tube having an inlet and an outlet, the inlet being in fluid communication with the inlet manifold and the outlet being in fluid communication with the outlet manifold, and at least one burner, the inlet manifold of one of the plurality of fired heaters being at a vertical height different from a vertical height of at least one of the other inlet manifolds or at least one of the outlet manifolds.

15 Claims, 3 Drawing Sheets

(56) References Cited

OTHER PUBLICATIONS

Yan et al. "Impact of manifold end structure on flow distribution of tube system of reforming furnace," Petroleum Refinery Engineering (2013), 43(2), 45-48.

Wang, Derui, "Outlet manifold technology for reformer in hydrogen generation," Petroleum Refinery Engineering (2009), 39(3), 1-7.

Green et al., "Case study: Use of inlet manifold design techniques for combustion applications," Applied Thermal Engineering (2002), 22(13), 1519-1527.

STAGGERED FIRED HEATER MANIFOLDS

BACKGROUND OF THE INVENTION

Hydrocarbon conversion processes often employ multiple reaction zones through which hydrocarbons pass in a series flow. Each reaction zone in the series often has a unique set of design requirements. A minimum design requirement of each reaction zone in the series is the hydraulic capacity to pass the desired throughput of hydrocarbons. An additional design requirement of each reaction zone is sufficient heating to perform a specified degree of hydrocarbon conversion.

One well-known hydrocarbon conversion process is catalytic reforming. Generally, catalytic reforming is a well-established hydrocarbon conversion process employed in the petroleum refining industry for improving the octane quality of hydrocarbon feedstocks. The primary products of reforming are a motor gasoline blending component or aromatics for petrochemicals. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. A reforming feedstock can be a hydrocracker, straight run, FCC, or coker naphtha, and it can contain many other components such as a condensate or thermal cracked naphtha.

Heaters or furnaces are often used in hydrocarbon conversion processes, such as reforming, to heat the process fluid before it is reacted. The heaters can be located before the first reaction zone and/or between reaction zones. Generally, most of the fired heaters or furnaces have a U-tube configuration with end fired burners. The fired heater box typically contains 3 or 4 cells made up of the charge heater and 2 or 3 interheaters. The inlet and outlet manifolds for all of the fired heater cells are at the same height.

It can be difficult to arrange all of the manifolds at the same height because of layout issues associated with the intersection of two or more pipes connecting the reaction zones and heater cells. It may be necessary to include additional straight lengths of piping and piping fittings, such as 45 degree and 90 degree elbows, so that all of the manifolds are at the same height. The additional piping can significantly increase the capital cost of the reaction zone sections because of the size of the pipe and the materials it is made of.

Therefore, there is a need for reaction zones including fired heaters having reduced costs.

SUMMARY OF THE INVENTION

One aspect of the invention involves a hydrocarbon conversion process. In one embodiment, the process includes passing a hydrocarbon stream through a plurality of reaction zones and a plurality of fired heaters, the effluent from a first reaction zone passing through one of the plurality of fired heaters before entering a second reaction zone. The plurality of fired heaters include a radiant section, an inlet manifold, an outlet manifold, at least one heater tube having an inlet and an outlet, the inlet being in fluid communication with the inlet manifold and the outlet being in fluid communication with the outlet manifold, and at least one burner, the inlet manifold of one of the plurality of fired heaters being at a vertical height different from a vertical height of at least one of the other inlet manifolds or at least one of the outlet manifolds.

Another aspect of the invention involves a catalytic reaction zone. In one embodiment, the catalytic reaction zone includes a plurality of catalytic reaction zones having a reaction zone inlet and a reaction zone outlet; and a plurality of fired heaters comprising a radiant section, an inlet manifold, an outlet manifold, at least one heater tube having an inlet and an outlet, the inlet being in fluid communication with the inlet manifold and the outlet being in fluid communication with the outlet manifold, and at least one burner, the inlet manifold of at least one fired heater being in fluid communication with the reaction zone outlet of the preceding catalytic reaction zone and the outlet manifold of the at least one fired heater being in fluid communication with the inlet manifold of the next catalytic reaction zone, the inlet manifold of one of the plurality of fired heaters being at a vertical height different from a vertical height of at least one of the other inlet manifolds or at least one of the outlet manifolds.

DETAILED DESCRIPTION OF THE INVENTION

Minimizing the piping equivalent length in hydrocarbon conversion processes between the reaction zones and the fired heater cells provides a number of important advantages. Capital costs are reduced for the large diameter transfer piping. The pressure drop and utility costs of the recycle gas compressor are also reduced. In addition, thermal cracking is reduced due to the reduction in the residence time of the reaction zone feed and reaction zone effluent streams.

The present invention achieves these advantages by changing the elevation of at least one of the inlet and/or outlet manifolds. By allowing different manifold vertical heights, the reaction zone transfer piping can be reduced in equivalent length.

Figure 1A:
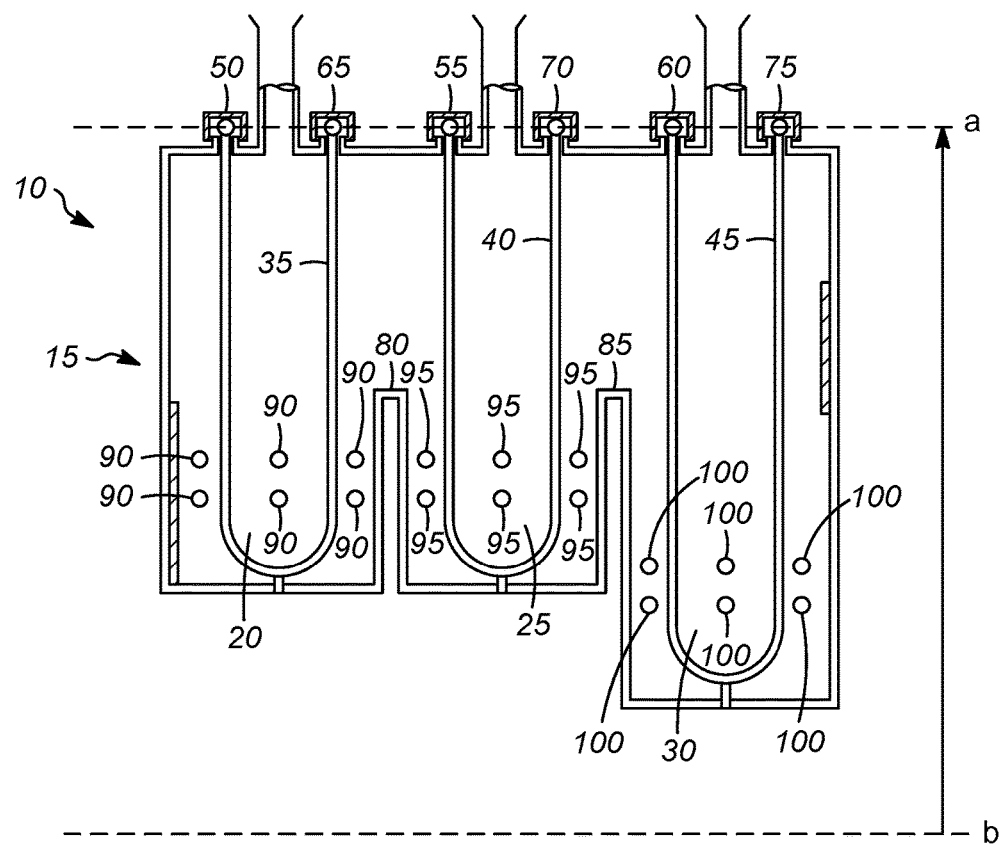
FIGS. 1A-B illustrate a portion of a radiant section of a fired heater box of the prior art.
Figure 1B:
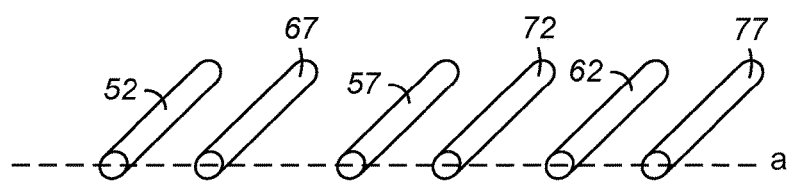

FIGS. 1A-B illustrate a portion 10 of the radiant section 15 of a fired heater box in a prior art apparatus. Typically, there are a plurality of radiant sections 15, such as a first radiant or charge section 20, a second radiant or first interheater section 25, and a third radiant or second interheater section 30. The flue gas rising from the radiant sections 20, 25, 30 can enter an optional convection section and exit a stack (not shown). Generally, each radiant section 20, 25, 30 includes several radiant tubes 35, 40, 45 in a parallel configuration and has an inlet 50, 55, 60 and an outlet 65, 70, 75. The radiant tubes 35, 40, 45 may be somewhat U-shaped and orientated upwardly, and several such radiant tubes 35, 40, 45 can be stacked front-to-back. The radiant sections 20, 25, 30 can be separated by firewalls 80, 85 and include, respectively, a plurality of burners 90, 95, 100.

As shown in FIGS. 1A-B, the inlets 50, 55, 60, which are connected to inlet manifolds 52, 57, 62 (FIG. 1B), and outlets 65, 70, 75, which are connected to outlet manifolds 67, 72, 77 (FIG. 1B), are all at the same vertical height a from a reference point b. The reference point can be any convenient reference point, such as the plant floor.

Figure 2A:
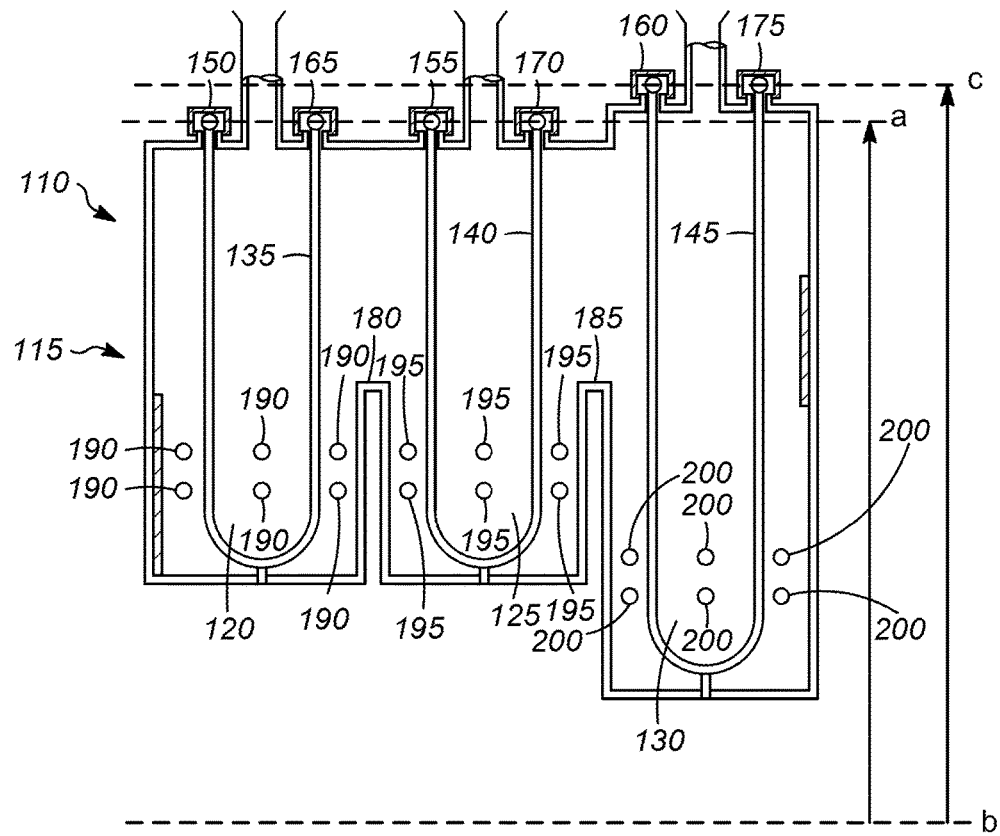
FIGS. 2A-B illustrate a portion of a radiant section of a fired heater box according to the present invention.
Figure 2B:
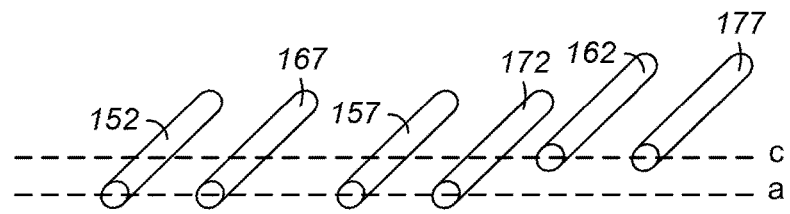

In contrast, in the present invention as shown in FIGS. 2A-B, in the portion 110 of the radiant section 115, there are a plurality of radiant sections 115, such as a first radiant or charge section 120, a second radiant or first interheater section 125, and a third radiant or second interheater section 130. Generally, each radiant section 120, 125, 130 includes several radiant tubes 135, 140, 145 in a parallel configuration and has an inlet 150, 155, 160 and an outlet 165, 170, 175. The radiant sections 120, 125, 130 can be separated by firewalls 180, 185 and include, respectively, a plurality of burners 190, 195, 200. The inlets 150, 155, which are connected to inlet manifolds 152, 157, and outlets 165, 170, which are connected to outlet manifolds 167, 172 (FIG. 2B), of radiant sections 120, 130 are at a first vertical height a, while the inlet 160, which is connected to inlet manifold 162, and outlet 175, which is connected to outlet manifold 177 (FIG. 2B) of radiant section 130, are at a second vertical height c.

As illustrated in FIGS. 2A-B, both the inlet and outlet manifold of one radiant section are at a different vertical height from the inlet and outlet manifolds of the other radiant sections. However, this is not required. At least one inlet manifold is at a vertical height different from the vertical height of at least one of the other inlet and/or outlet manifolds. For example, one inlet manifold could be at a different vertical height from all of the other inlet and outlet manifolds, some inlet manifolds could be at a different vertical height from other inlet and/or outlet manifolds, or all of the inlet manifolds could be at a different vertical height from all of the outlet manifolds. In addition, there could be three or more different heights. For example, one inlet manifold could be at a first height, another inlet or outlet manifold could be at a second height, and a third inlet or outlet manifold could be at a third height, with all the heights being different.

Figure 3:
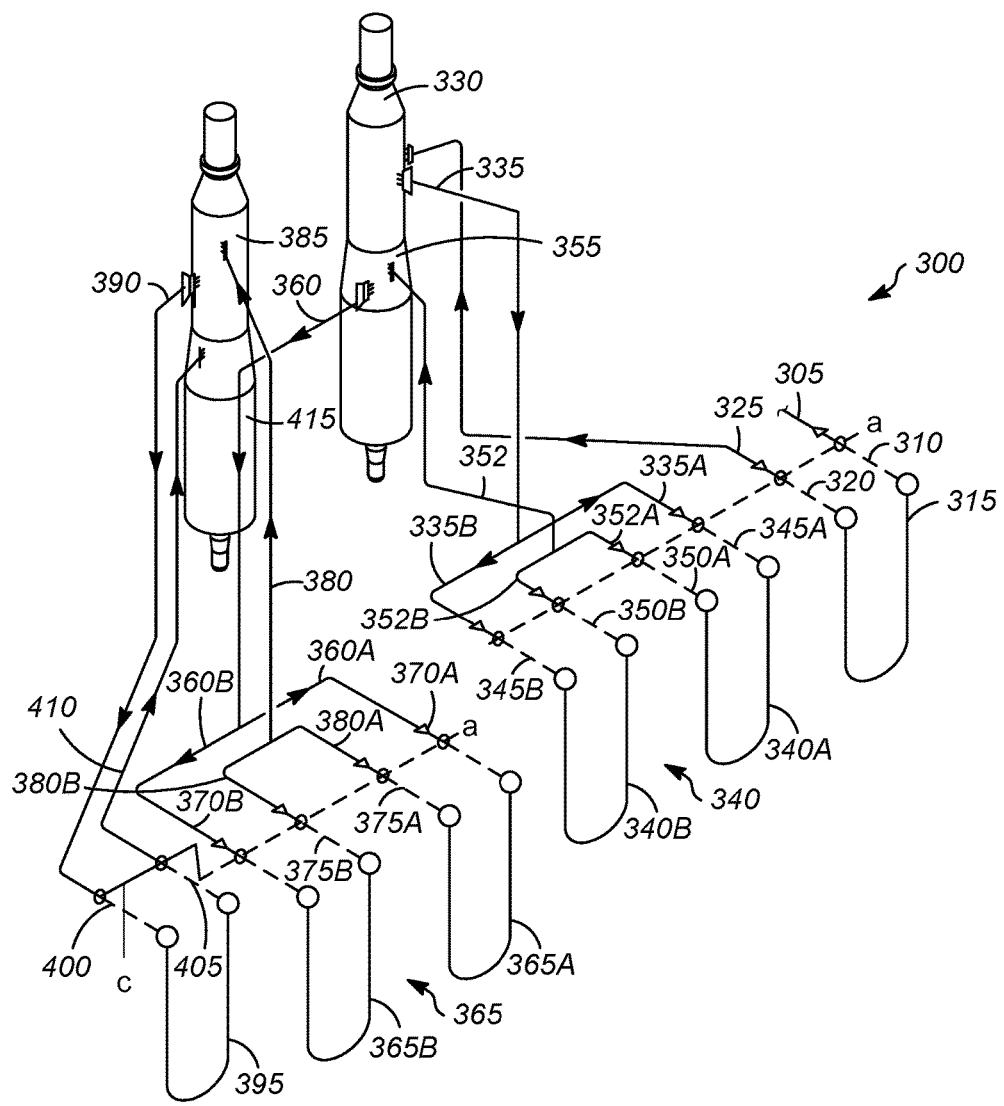
FIG. 3 illustrates one embodiment of a hydrocarbon conversion process according to the present invention.

FIG. 3 illustrates a hydrocarbon conversion process 300. The hydrocarbon feed in line 305 enters the inlet manifold 310 of the first fired heater 315 and exits through the outlet manifold 320. The heated hydrocarbon feed in line 325 flows up to the inlet of the first reaction zone 330.

The effluent line 335 from the first reaction zone 330 flows down and is split into two portions 335A, 335B which flow to the second fired heater 340. The effluent in line 335A enters inlet manifold 345A, flows through the second fired heater 340A, and exits through outlet manifold 350A. The effluent in line 335B enters inlet manifold 345B, flows through the second fired heater 340B, and exits through outlet manifold 350B. Lines 352A, 352B are combined into line 352 which goes up to the inlet of the second reaction zone 355.

The effluent in line 360 from the second reaction zone 355 flows down and is split into two portions 360A, 360B which flow to the third fired heater 365. The effluent in line 360A enters inlet manifold 370A, flows through the third fired heater 365A, and exits through outlet manifold 375A. The effluent in line 360B enters inlet manifold 370B, flows through the third fired heater 365B, and exits through outlet manifold 375B. Lines 380A, 380B are combined into line 380 which goes up to the inlet of the third reaction zone 385.

The effluent in line 390 from the third reaction zone 385 flows down to the fourth fired heater 395. The effluent in line 390 enters inlet manifold 400, flows through the fourth fired heater 395, and exits through outlet manifold 405. Line 410 goes up to the inlet of the fourth reaction zone 415. The effluent (not shown) from the fourth reaction zone is then sent for further processing as needed.

The inlet manifold 400 and outlet manifold 405 of the fourth fired heater are at a vertical height c which is higher than the vertical height of the other inlet manifolds 310, 345A, 345B, 370A, 370B and outlet manifolds 320, 350A, 350B, 375A, 375B which are at a vertical height a. This elevation difference allows the outlet manifold 405 to avoid interference with line 360B to the third fired heater 365 without adding extra piping and/or fittings.

There are a plurality of reaction zones and a plurality of fired heaters. The hydrocarbon stream passes from one reaction zone through a fired heater and into another reaction zone. There is a fired heater between any reaction zones in series. There will typically be a fired heater before the first reaction zone to heat the incoming stream. There can be three, four, five, or more reaction zones and three, four, five, or more fired heaters.

Generally, a catalytic conversion of a hydrocarbon-containing reactant stream in a reaction system has at least two reaction zones where the reactant stream flows serially through the reaction zones. Reaction systems having multiple zones generally take one of two forms: a side-by-side form or a stacked form. In the side-by-side form, multiple and separate reaction vessels, each that can include a reaction zone, may be placed along side each other. In the stacked form, one common reaction vessel can contain multiple and separate reaction zones that may be placed on top of each other. In both reaction systems, there can be intermediate heating or cooling between the reaction zones, depending on whether the reactions can be endothermic or exothermic.

Although the reaction zones can include any number of arrangements for hydrocarbon flow such as downflow, upflow, and crossflow, the most common reaction zone to which this invention is applied may be radial flow. A radial flow reaction zone generally includes cylindrical sections having varying nominal cross-sectional areas, vertically and coaxially disposed to form the reaction zone. Briefly, a radial flow reaction zone typically includes a cylindrical reaction vessel containing a cylindrical outer catalyst retaining screen and a cylindrical inner catalyst retaining screen that are both coaxially-disposed within the reaction vessel. The inner screen may have a nominal, internal cross-sectional area that is less than that of the outer screen, which can have a nominal, internal cross-sectional area that is less than that of the reaction vessel. Generally, the reactant stream is introduced into the annular space between the inside wall of the reaction vessel and the outside surface of the outer screen. The reactant stream can pass through the outer screen, flow radially through the annular space between the outer screen and the inner screen, and pass through the inner screen. The stream that may be collected within the cylindrical space inside the inner screen can be withdrawn from the reaction vessel. Although the reaction vessel, the outer screen, and the inner screen may be cylindrical, they may also take any suitable shape, such as triangular, square, oblong, or diamond, depending on many design, fabrication, and technical considerations. As an example, generally it is common for the outer screen to not be a continuous cylindrical screen but to instead be an arrangement of separate, semi-elliptical, tubular screens called scallops that may be arrayed around the circumference of the inside wall of the reaction vessel. The inner screen is commonly a perforated center pipe that may be covered around its outer circumference with a screen.

Preferably, the catalytic conversion processes include catalyst that can include particles that are movable through the reaction zones. The catalyst particles may be movable through the reaction zone by any number of motive devices, including conveyors or transport fluid, but most commonly the catalyst particles are movable through the reaction zone by gravity. Typically, in a radial flow reaction zone, the catalyst particles can fill the annular space between the inner and outer screens, which may be called the catalyst bed. Catalyst particles can be withdrawn from a bottom portion of a reaction zone, and catalyst particles may be introduced into a top portion of the reaction zone. The catalyst particles withdrawn from the final reaction zone can subsequently be recovered from the process, regenerated in a regeneration zone of the process, or transferred to another reaction zone. Likewise, the catalyst particles added to a reaction zone can be catalyst that is being newly added to the process, catalyst that has been regenerated in a regeneration zone within the process, or catalyst that is transferred from another reaction zone.

Illustrative reaction vessels that have stacked reaction zones are disclosed in U.S. Pat. Nos. 3,706,536 and 5,130,106, the teachings of which are incorporated herein by reference in their entirety. Generally, the transfer of the gravity-flowing catalyst particles from one reaction zone to another, the introduction of fresh catalyst particles, and the withdrawal of spent catalyst particles are effected through catalyst transfer conduits.

The feedstocks converted by these processes can include various fractions from a range of crude oils. Exemplary feedstocks converted by these processes generally include naphtha, including, but not limited to, straight run naphtha, hydrocracked naphtha, visbreaker naphtha, coker naphtha, and fluid catalytic cracked naphtha. Light naphtha including some butane, pentanes, and light hexanes may also be included in the feedstock.

Processes having multiple reaction zones may include a wide variety of hydrocarbon conversion processes such as catalytic reforming, alkylation, dealkylation, hydrogenation, dehydrogenation, hydrotreating, isomerization, dehydroisomerization, dehydrocyclization, cracking, and hydrocracking processes. Catalytic reforming also often utilizes multiple reaction zones, and will be referenced hereinafter in the embodiments depicted in the drawings. Further information on reforming processes may be found in, for example, U.S. Pat. Nos. 4,119,526; 4,409,095; and 4,440,626.

Usually, in catalytic reforming, a feedstock is admixed with a recycle stream comprising hydrogen to form what is commonly referred to as a combined feed stream, and the combined feed stream is contacted with a catalyst in a reaction zone. The usual feedstock for catalytic reforming is a petroleum fraction known as naphtha and having an initial boiling point of about 82° C. (about 180° F.), and an end boiling point of about 203° C. (about 400° F.). The catalytic reforming process is particularly applicable to the treatment of straight run naphthas comprised of relatively large concentrations of naphthenic and substantially straight chain paraffinic hydrocarbons, which are subject to aromatization through dehydrogenation and/or cyclization reactions. The preferred charge stocks are naphthas consisting principally of naphthenes and paraffins that can boil within the gasoline range, although, in many cases, aromatics also can be present. This preferred class includes straight-run gasolines, natural gasolines, synthetic gasolines, and the like. As an alternative embodiment, it is frequently advantageous to charge thermally or catalytically cracked gasolines or partially reformed naphthas. Mixtures of straight-run and cracked gasoline-range naphthas can also be used to advantage. The gasoline-range naphtha charge stock may be a full-boiling gasoline having an initial boiling point of about 40 to about 82° C. (about 104 to about 180° F.) and an end boiling point within the range of about 160 to about 220° C. (about 320 to about 428° F.), or may be a selected fraction thereof which generally can be a higher-boiling fraction commonly referred to as a heavy naphtha, for example, a naphtha boiling in the range of about 100 to about 200° C. (about 212 to about 392° F.). In some cases, it is also advantageous to charge pure hydrocarbons or mixtures of hydrocarbons that have been recovered from extraction units, for example, raffinates from aromatics extraction or straight-chain paraffins, which are to be converted to aromatics. In some other cases, the feedstock may also contain light hydrocarbons that have 1-5 carbon atoms, but since these light hydrocarbons cannot be readily reformed into aromatic hydrocarbons, these light hydrocarbons entering with the feedstock are generally minimized.

An exemplary flow through the train of heating and reaction zones is a 4-1.5 reaction zone catalytic reforming process, having first, second, third and fourth reaction zones, which can be described as follows.

A naphtha-containing feedstock can admix with a hydrogen-containing recycle gas to form a combined feed stream, which may pass through a combined feed heat exchanger. In the combined feed heat exchanger, the combined feed can be heated by exchanging heat with the effluent of the fourth reaction zone. However, the heating of the combined feed stream that occurs in the combined feed heat exchanger is generally insufficient to heat the combined feed stream to the desired inlet temperature of the first reaction zone.

Generally, hydrogen is supplied to provide an amount of about 1 to about 20 moles of hydrogen per mole of hydrocarbon feedstock entering the reaction zones. Hydrogen is preferably supplied to provide an amount of less than about 3.5 moles of hydrogen per mole of hydrocarbon feedstock entering the reaction zones. If hydrogen is supplied, it may be supplied upstream of the combined feed exchanger, downstream of the combined feed exchanger, or both upstream and downstream of the combined feed exchanger. Alternatively, no hydrogen may be supplied before entering the reforming zones with the hydrocarbon feedstock. Even if hydrogen is not provided with the hydrocarbon feedstock to the first reaction zone, the naphthene reforming reactions that occur within the first reaction zone can yield hydrogen as a by-product. This by-product, or in-situ-produced, hydrogen leaves the first reaction zone in an admixture with the first reaction zone effluent and then can become available as hydrogen to the second reaction zone and other downstream reaction zones. This in situ hydrogen in the first reaction zone effluent usually amounts to about 0.5 to about 2 moles of hydrogen per mole of hydrocarbon feedstock.

Usually, the combined feed stream, or the hydrocarbon feedstock if no hydrogen is provided with the hydrocarbon feedstock, enters a heat exchanger at a temperature of generally about 38 to about 177° C. (about 100 to about 350° F.), and more usually about 93 to about 121° C. (about 200 to about 250° F.). Because hydrogen is usually provided with the hydrocarbon feedstock, this heat exchanger may be referred to herein as the combined feed heat exchanger, even if no hydrogen is supplied with the hydrocarbon feedstock. Generally, the combined feed heat exchanger heats the combined feed stream by transferring heat from the effluent stream of the last reforming reaction zone to the combined feed stream. Preferably, the combined feed heat exchanger is an indirect, rather than a direct, heat exchanger, in order to prevent valuable reformate product in the last reaction zone's effluent from intermixing with the combined feed where the reformate quality could be degraded.

Although the flow pattern of the combined feed stream and the last reaction zone effluent stream within the combined feed heat exchanger could be completely cocurrent, reversed, mixed, or cross flow, the flow pattern is preferably countercurrent. By a countercurrent flow pattern, it is meant that the combined feed stream, while at its coldest temperature, contacts one end (i.e., the cold end) of the heat exchange surface of the combined feed heat exchanger while the last reaction zone effluent stream contacts the cold end of the heat exchange surface at its coldest temperature as well. Thus, the last reaction zone effluent stream, while at its coldest temperature within the heat exchanger, exchanges heat with the combined feed stream that is also at its coldest temperature within the heat exchanger. At another end (i.e., the hot end) of the combined feed heat exchanger surface, the last reaction zone effluent stream and the combined feed stream, both at their hottest temperatures within the heat exchanger, contact the hot end of the heat exchange surface and thereby exchange heat. Between the cold and hot ends of the heat exchange surface, the last reaction zone effluent stream and the combined feed stream flow in generally opposite directions, so that, in general, at any point along the heat transfer surface, the hotter the temperature of the last reaction zone effluent stream, the hotter is the temperature of the combined feed stream with which the last reaction zone effluent stream exchanges heat. For further information on flow patterns in heat exchangers, see, for example, pages 10-24 to 10-31 of Perry's Chemical Engineers' Handbook, Sixth Edition, edited by Robert H. Perry et al., published by McGraw-Hill Book Company in New York, in 1984, and the references cited therein.

Generally, the combined feed heat exchanger operates with a hot end approach that is generally less than a difference of about 56° C. (about 100° F.), or less than a difference of about 33° C. (about 60° F.), or less than a difference of about 28° C. (about 50° F.). As used herein, the term "hot end approach" is defined as follows: based on a heat exchanger that exchanges heat between a hotter last reaction zone effluent stream and a colder combined feed stream, where T1 is the inlet temperature of the last reaction zone effluent stream, T2 is the outlet temperature of the last reaction zone effluent stream, t1 is the inlet temperature of the combined feed stream, and t2 is the outlet temperature of the combined feed stream. Then, as used herein, for a countercurrent heat exchanger, the "hot end approach" is defined as the difference between T1 and t2. In general, the smaller the hot end approach, the greater is the degree to which the heat in the last reaction zone's effluent is exchanged to the combined feed stream.

Although shell-and-tube type heat exchangers may be used, another possibility is a plate type heat exchanger. Plate type exchangers are well known and commercially available in several different and distinct forms, such as spiral, plate and frame, brazed-plate fin, and plate fin-and-tube types. Plate type exchangers are described generally on pages 11-21 to 11-23 in Perry's Chemical Engineers' Handbook, Sixth Edition, edited by R. H. Perry et al., and published by McGraw Hill Book Company, in New York, in 1984.

In one embodiment, the combined feed stream can leave the combined feed heat exchanger at a temperature of about 399 to about 516° C. (about 750 to about 960° F.).

Consequently, after exiting the combined feed heat exchanger and prior to entering the first reaction zone, the combined feed stream often requires additional heating. This additional heating can occur in a heater, which is commonly referred to as a charge heater, which can heat the combined feed stream to the desired inlet temperature of the first reaction zone. Such a heater can be a gas-fired, an oil-fired, or a mixed gas-and-oil-fired heater, of a kind that is well known to persons of ordinary skill in the art of reforming. The heater may heat the first reaction zone effluent stream by radiant and/or convective heat transfer. Commercial fired heaters for reforming processes typically have individual radiant heat transfer sections for individual heaters, and an optional common convective heat transfer section that is heated by the flue gases from the radiant sections.

Desirably, the stream first enters the radiant section of the heater by way of an inlet manifold. The stream can enter and exit the top or lower portion of the radiant section through the manifold and into U-shaped or inverted U-shaped heater tubes, or enter the top portion where the temperature is lowest in the radiant section and exit at the bottom where the temperature is hottest in the radiant section, or conversely, enter at the bottom and exit at the top. Preferably, the stream enters and exits the top portion of the radiant section for this and any subsequent heaters.

Afterwards, the combined feed stream can enter the optional convection section of that same heater. The stream can enter and exit the top or lower portion of the convection section, or enter the top portion where the temperature is lowest in the convection section and exit at the bottom where the temperature is hottest in the convection section through U-shaped tubes that are usually orientated sideways, or conversely, enter at the bottom and exit at the top. Preferably, the stream enters the top portion and exits the bottom portion of the convection section for this and any subsequent heaters.

It should be understood that one or more heaters described herein (e.g., a charge or an interheater) can have the stream enter the radiant section then the optional convection section, may have the stream enter the optional convection section and then the radiant section, or may have the stream enter only the radiant section, depending, e.g., on the maximum tube wall temperature limitations.

Commercial fired heaters for reforming processes typically have individual radiant heat transfer sections for individual heaters and a common convective heat transfer section that may be heated by the flue gases from the radiant sections. The temperature of the combined feed stream leaving the charge heater, which may also be the inlet temperature of the first reaction zone, is generally about 482 to about 560° C. (about 900 to about 1,040° F.), preferably about 493 to about 549° C. (about 920 to about 1,020° F.).

Once the combined feed stream passes to the first reaction zone, the combined feed stream may undergo conversion reactions. In a common form, the reforming process can employ the catalyst particles in several reaction zones interconnected in a series flow arrangement. There may be any number of reaction zones, but usually the number of reaction zones is 3, 4 or 5. Because reforming reactions occur generally at an elevated temperature and are generally endothermic, each reaction zone usually has associated with it one or more heating zones, which heats the reactants to the desired reaction temperature.

This invention can be applicable in a reforming reaction system having at least two catalytic reaction zones where at least a portion of the reactant stream and at least a portion of the catalyst particles flow serially through the reaction zones. These reforming reaction systems can be a side-by-side form or a stacked form, as discussed above.

Generally, the reforming reactions are normally effected in the presence of catalyst particles comprised of one or more Group VIII (IUPAC 8-10) noble metals (e.g., platinum, iridium, rhodium, and palladium) and a halogen combined with a porous carrier, such as a refractory inorganic oxide. U.S. Pat. No. 2,479,110, for example, teaches an alumina-platinum-halogen reforming catalyst. Although the catalyst may contain about 0.05 to about 2.0 wt-% of Group VIII metal, a less expensive catalyst, such as a catalyst containing about 0.05 to about 0.5 wt-% of Group VIII metal may be used. The preferred noble metal is platinum. In addition, the catalyst may contain indium and/or a lanthanide series metal such as cerium. The catalyst particles may also contain about 0.05 to about 0.5 wt-% of one or more Group IVA (IUPAC 14) metals (e.g., tin, germanium, and lead), such as described in U.S. Pat. Nos. 4,929,333, 5,128,300, and the references cited therein. The halogen is typically chlorine, and alumina is commonly the carrier. Suitable alumina materials include, but are not limited to, gamma, eta, and theta alumina. One property related to the performance of the catalyst is the surface area of the carrier. Preferably, the carrier has a surface area of about 100 to about 500 m$^2$/g. The activity of catalysts having a surface area of less than about 130 m$^2$/g tend to be more detrimentally affected by catalyst coke than catalysts having a higher surface area. Generally, the particles are usually spheroidal and have a diameter of about 1.6 to about 3.1 mm (about 1/16 to about 1/8 inch), although they may be as large as about 6.35 mm (about 1/4 inch) or as small as about 1.06 mm (about 1/24 inch). In a particular reforming reaction zone, however, it is desirable to use catalyst particles which fall in a relatively narrow size range. A preferred catalyst particle diameter is about 1.6 mm (about 1/16 inch).

A reforming process can employ a fixed catalyst bed, or a moving bed reaction vessel and a moving bed regeneration vessel. In the latter, generally regenerated catalyst particles are fed to the reaction vessel, which typically includes several reaction zones, and the particles flow through the reaction vessel by gravity. Catalyst may be withdrawn from the bottom of the reaction vessel and transported to the regeneration vessel. In the regeneration vessel, a multi-step regeneration process is typically used to regenerate the catalyst to restore its full ability to promote reforming reactions. U.S. Pat. Nos. 3,652,231; 3,647,680 and 3,692,496 describe catalyst regeneration vessels that are suitable for use in a reforming process. Catalyst can flow by gravity through the various regeneration steps and then be withdrawn from the regeneration vessel and transported to the reaction vessel. Generally, arrangements are provided for adding fresh catalyst as make-up to and for withdrawing spent catalyst from the process. Movement of catalyst through the reaction and regeneration vessels is often referred to as continuous though, in practice, it is semicontinuous. By semicontinuous movement, it is meant the repeated transfer of relatively small amounts of catalyst at closely spaced points in time. For example, one batch every twenty minutes may be withdrawn from the bottom of the reaction vessel and withdrawal may take five minutes, that is, catalyst can flow for five minutes. If the catalyst inventory in a vessel is relatively large in comparison with this batch size, the catalyst bed in the vessel may be considered to be continuously moving. A moving bed system can have the advantage of maintaining production while the catalyst is removed or replaced.

Typically, the rate of catalyst movement through the catalyst beds may range from as little as about 45.5 kg (about 100 pounds) per hour to about 2,722 kg (about 6,000 pounds) per hour, or more.

The reaction zones of the present invention can be operated at reforming conditions, which include a range of pressures generally from atmospheric pressure of about 0 to about 6,895 kPa(g) (about 0 psi(g) to about 1,000 psi(g)), with particularly good results obtained at the relatively low pressure range of about 276 to about 1,379 kPa(g) (about 40 to about 200 psi(g)). The overall liquid hourly space velocity (LHSV) based on the total catalyst volume in all of the reaction zones is generally about 0.1 to about 10 hr$^{-1}$, or about 1 to about 5 hr$^{-1}$, and or about 1.5 to about 2.0 hr$^{-1}$.

As mentioned previously, generally naphthene reforming reactions that are endothermic occur in the first reaction zone, and thus the outlet temperature of the first reaction zone can be less than the inlet temperature of the first reaction zone and is generally about 316 to about 454° C. (about 600 to about 850° F.). The first reaction zone may contain generally about 5%-about 50%, and more usually about 10%-about 30%, of the total catalyst volume in all of the reaction zones. Consequently, the liquid hourly space velocity (LHSV) in the first reaction zone, based on the catalyst volume in the first reaction zone, can be generally 0.2-200 hr$^{-1}$, or about 2 to about 100 hr$^{-1}$, or about 5 to about 20 hr$^{-1}$. Generally, the catalyst particles are withdrawn from the first reaction zone and passed to the second reaction zone; such particles generally have a coke content of less than about 2 wt-% based on the weight of catalyst.

Because of the endothermic reforming reactions that occur in the first reaction zone, generally the temperature of the effluent of the first reaction zone falls not only to less than the temperature of the combined feed to the first reaction zone, but also to less than the desired inlet temperature of the second reaction zone. Therefore, the effluent of the first reaction zone can pass through another heater, which is commonly referred to as the first interheater, and which can heat the first reaction zone effluent to the desired inlet temperature of the second reaction zone.

Generally, a heater is referred to as an interheater when it is located between two reaction zones, such as the first and second reaction zones. The first reaction zone effluent stream leaves the interheater at a temperature of generally about 482 to about 560° C. (about 900 to about 1,040° F.). Accounting for heat losses, the interheater outlet temperature is generally not more than about 5° C. (about 10° F.), and preferably not more than about 1° C. (about 2° F.), more than the inlet temperature of the second reaction zone. Accordingly, the inlet temperature of the second reaction zone is generally about 482 to about 560° C. (about 900 to about 1,040° F.), or about 493 to about 549° C. (about 920 to about 1,020° F.). The inlet temperature of the second reaction zone is usually at least about 33° C. (about 60° F.) greater than the inlet temperature of the first reaction zone, and may be at least about 56° C. (about 100° F.) or even at least about 83 C (about 150 F) higher than the first reaction zone inlet temperature.

On exiting the first interheater, generally the first reaction zone effluent enters the second reaction zone. As in the first reaction zone, the endothermic reactions can cause another decline in temperature across the second reaction zone. Generally, however, the temperature decline across the second reaction zone is less than the temperature decline across the first reaction zone, because the reactions that occur in the second reaction zone are generally less endothermic than the reactions that occur in the first reaction zone. Despite the somewhat lower temperature decline across the second reaction zone, the effluent of the second reaction zone is nevertheless still at a temperature that is less than the desired inlet temperature of the third reaction zone.

The second reaction zone generally includes about 10%-about 60%, and more usually about 15% to about 40%, of the total catalyst volume in all of the reaction zones. Consequently, the liquid hourly space velocity (LHSV) in the second reaction zone, based on the catalyst volume in the second reaction zone, is generally about 0.13 to about 134 $hr^{-1}$, preferably about 1.3 to about 67 $hr^{-1}$, and more preferably about 3.3 to about 13.4 $hr^{-1}$.

The second reaction zone effluent can pass a second interheater (the first interheater being the previously described interheater between the first and the second reaction zones), and after heating, can pass to a third reaction zone. However, one or more additional heaters and/or reaction zones after the second reaction zone can be omitted; that is, the second reaction zone may be the last reaction zone in the train. The third reaction zone contains generally about 25%-about 75%, and more usually about 30% to about 50%, of the total catalyst volume in all of the reaction zones. Likewise, the third reaction zone effluent can pass to a third interheater and from there to a fourth reaction zone. The fourth reaction zone contains generally about 30% to about 80%, and more usually about 40% to about 50%, of the total catalyst volume in all of the reaction zones. The inlet temperatures of the third, fourth, and subsequent reaction zones are generally about 482 to about 560° C. (about 900 to about 1,040° F.), preferably about 493 to about 549° C. (about 920 to about 1,020° F.).

Because the reforming reactions that occur in the second and subsequent (i.e., third and fourth) reaction zones are generally less endothermic than those that occur in the first reaction zone, the temperature drop that occurs in the later reaction zones is generally less than that that occurs in the first reaction zone. Thus, the outlet temperature of the last reaction zone may be about 11° C. (about 20° F.) or less below the inlet temperature of the last reaction zone, and indeed may conceivably be higher than the inlet temperature of the last reaction zone.

The desired reformate octane of the $C_{5+}$ fraction of the reformate is generally about 85 to about 107 clear research octane number ($C_{5+}$ RONC), and preferably about 98 to about 102 $C_{5+}$ RONC.

Moreover, any inlet temperature profiles can be utilized with the above-described reaction zones. The inlet temperature profiles can be flat or skewed, such as ascending, descending, hill-shaped, or valley-shaped. Desirably, the inlet temperature profile of the reaction zones is flat.

The last reaction zone effluent stream can be cooled in the combined feed heat exchanger by transferring heat to the combined feed stream. After leaving the combined feed heat exchanger, the cooled last reaction zone effluent passes to a product recovery section. Suitable product recovery sections are known to persons of ordinary skill in the art of reforming. Exemplary product recovery facilities generally include gas-liquid separators for separating hydrogen and $C_1$ through $C_3$ hydrocarbon gases from the last reaction zone effluent stream, and fractionation columns for separating at least a portion of the $C_4$ to $C_5$ light hydrocarbons from the remainder of the reformate. In addition, the reformate may be separated by distillation into a light reformate fraction and a heavy reformate fraction.

During the course of a reforming reaction with a moving catalyst bed, catalyst particles become deactivated as a result of mechanisms such as the deposition of coke on the particles; that is, after a period of time in use, the ability of catalyst particles to promote reforming reactions decreases to the point that the catalyst is no longer useful. The catalyst can be reconditioned, or regenerated, before it is reused in a reforming process.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A hydrocarbon conversion process comprising:
    passing a hydrocarbon stream through a plurality of reaction zones and a plurality of fired heaters, an effluent from a first reaction zone passing through one of the plurality of fired heaters before entering a second reaction zone, the plurality of fired heaters being in side-by-side configuration and each comprising:
        a radiant section, an inlet manifold, an outlet manifold, at least one heater tube having an inlet and an outlet, the inlet being in fluid communication with the inlet manifold and the outlet being in fluid communication with the outlet manifold, and at least one burner, the inlet manifold of one of the plurality of fired heaters being at a vertical height different from a vertical height of at least one of the other inlet manifolds or at least one of the outlet manifolds, wherein the inlet manifold and outlet manifold are within the radiant section, and wherein the vertical height is relative to a common reference point.

2. The process of claim 1 wherein the inlet and outlet manifolds of one of the fired heaters are at the vertical height different from the vertical height of the inlet and outlet manifolds of at least one other fired heater.

3. The process of claim 1 wherein the inlet and outlet manifolds of two of the fired heaters are at the vertical height different from the vertical height of the inlet and outlet manifolds of at least two other fired heaters.

4. The process of claim 1 wherein the inlet manifolds of all of the fired heaters are at the vertical height different from the vertical height of the outlet manifolds of all the fired heaters.

5. The process of claim 1 wherein the inlet manifold of one of the plurality of fired heaters is at a first vertical height, at least one of the other inlet manifolds or at least one of the outlet manifolds is at a second vertical height, and at least one of the other inlet manifolds or at least one of the other outlet manifolds, distinct from the at least one other inlet manifold or outlet manifold at the second height, is at a third vertical height, the first, second, and third vertical heights being different.

6. The process of claim 1 wherein there are at least three reactions zones and at least three fired heaters, and wherein the hydrocarbon stream passes though one of the fired heaters before passing through the first reaction zone.

7. The process of claim 1 wherein there are at least four reactions zones and at least four fired heaters, and wherein the hydrocarbon stream passes though one of the fired heaters before passing through the first reaction zone.

8. The process of claim 1 wherein the hydrocarbon process comprises catalytic reforming, alkylation, dealkylation, hydrogenation, dehydrogenation, hydrotreating, isomerization, dehydroisomerization, dehydrocyclization, cracking, or hydrocracking.

9. A catalytic reforming process comprising:
passing a hydrocarbon stream through a plurality of catalytic reforming reaction zones and a plurality of fired heaters, an effluent from a first reaction zone passing through one of the plurality of fired heaters before entering a second reaction zone, the plurality of fired heaters being in side-by-side configuration and each comprising:
a radiant section, an inlet manifold, an outlet manifold, at least one heater tube having an inlet and an outlet, the inlet being in fluid communication with the inlet manifold and the outlet being in fluid communication with the outlet manifold, and at least one burner, the inlet manifold of one of the plurality of fired heaters being at a vertical height different from a vertical height of at least one of the other inlet manifolds or at least one of the outlet manifolds, wherein the inlet manifold and outlet manifold are within the radiant section, and wherein the vertical height is relative to a common reference point.

10. The process of claim 9 wherein the inlet and outlet manifolds of one of the fired heaters are at the vertical height different from the vertical height of the inlet and outlet manifolds of at least one other fired heater.

11. The process of claim 9 wherein the inlet and outlet manifolds of two of the fired heaters are at the vertical height different from the vertical height of the inlet and outlet manifolds of at least two other fired heaters.

12. The process of claim 9 wherein the inlet manifolds of all of the fired heaters are at the vertical height different from the vertical height of the outlet manifolds of all the fired heaters.

13. The process of claim 9 wherein the inlet manifold of one of the plurality of fired heaters is at a first vertical height, at least one of the other inlet manifolds or at least one of the outlet manifolds is at a second vertical height, and at least one of the other inlet manifolds or at least one of the outlet manifolds distinct from the at least one other inlet manifold or outlet manifold at the second height, is at a third vertical height, the first, second, and third vertical heights being different.

14. The process of claim 9 wherein there are at least three reactions zones and at least three fired heaters, and wherein the hydrocarbon stream passes though one of the fired heaters before passing through the first reaction zone.

15. The process of claim 9 wherein there are at least four reactions zones and at least four fired heaters, and wherein the hydrocarbon stream passes though one of the fired heaters before passing through the first reaction zone.

* * * * *